United States Patent [19]

Kataoka

[11] Patent Number: 4,508,284

[45] Date of Patent: * Apr. 2, 1985

[54] APPARATUS FOR CONTROLLING WINDING TENSION

[75] Inventor: Hiroshi Kataoka, Iyo-mishima, Japan

[73] Assignee: Kataoka Machine Product Co., Ltd., Ehime, Japan

[ * ] Notice: The portion of the term of this patent subsequent to Dec. 9, 1997 has been disclaimed.

[21] Appl. No.: 569,940

[22] Filed: Jan. 12, 1984

Related U.S. Application Data

[60] Continuation of Ser. No. 416,917, Sep. 13, 1982, abandoned, which is a continuation-in-part of Ser. No. 174,579, Aug. 4, 1980, abandoned, which is a division of Ser. No. 41,410, May 22, 1979, Pat. No. 4,238,084, which is a continuation of Ser. No. 660,632, Feb. 23, 1976, abandoned, which is a continuation-in-part of Ser. No. 485,618, Jul. 3, 1974, abandoned.

[30] Foreign Application Priority Data

Jul. 6, 1973 [JP] Japan ................................. 48-76396

[51] Int. Cl.³ ............................................. B65H 23/20
[52] U.S. Cl. ................................................... 242/75.51
[58] Field of Search ............... 242/75.51, 75.52, 75.53, 242/75.44, 57, 67.5; 318/6, 7

[56] References Cited

U.S. PATENT DOCUMENTS

| | | | |
|---|---|---|---|
| 3,061,228 | 10/1962 | Andrade | 242/75.51 |
| 3,595,492 | 7/1971 | Furst | 242/75.51 |
| 3,663,806 | 5/1972 | Drankhan et al. | 242/75.51 X |
| 3,871,598 | 3/1975 | Kataoka | 242/75.51 |
| 3,910,521 | 10/1975 | O'Callaghan | 242/75.51 |
| 4,052,599 | 10/1977 | Whiteley et al. | 242/75.51 X |

Primary Examiner—John M. Jillions
Attorney, Agent, or Firm—Parkhurst & Oliff

[57] ABSTRACT

An apparatus for winding a sheet into a roll by the center drive system, comprising a device for detecting a winding tension, a device for calculating the detected value by comparison with a desired tensile value conditioned by a dimension of the winding roll as based on a winding length growing with the progress of the winding, and a device for controlling the winding tension by the compared and calculated value. The tensile control adopts a theoretical equation in which the winding length is a variable and for which certain conditions are taken into consideration. The detected winding tension is compared with the preset appropriate tensile value, and is calculated in an analog or digital system so as to control a winding torque. The tensile control is accomplished by a torque actuator which is coupled to a winding axis.

1 Claim, 5 Drawing Figures

F I G. 1
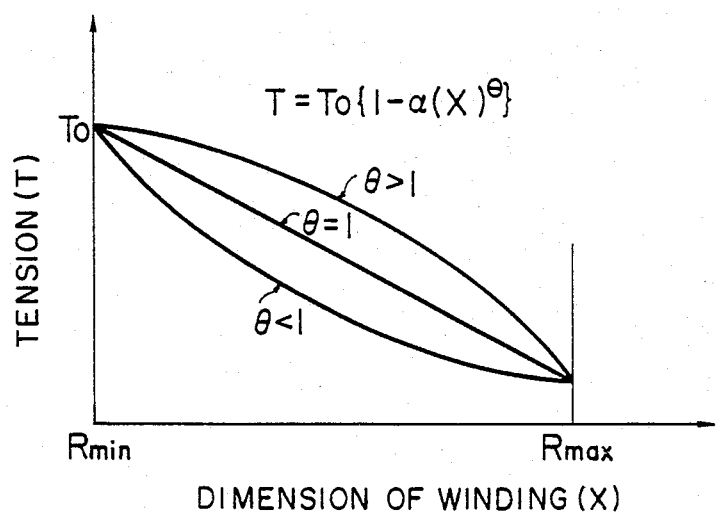

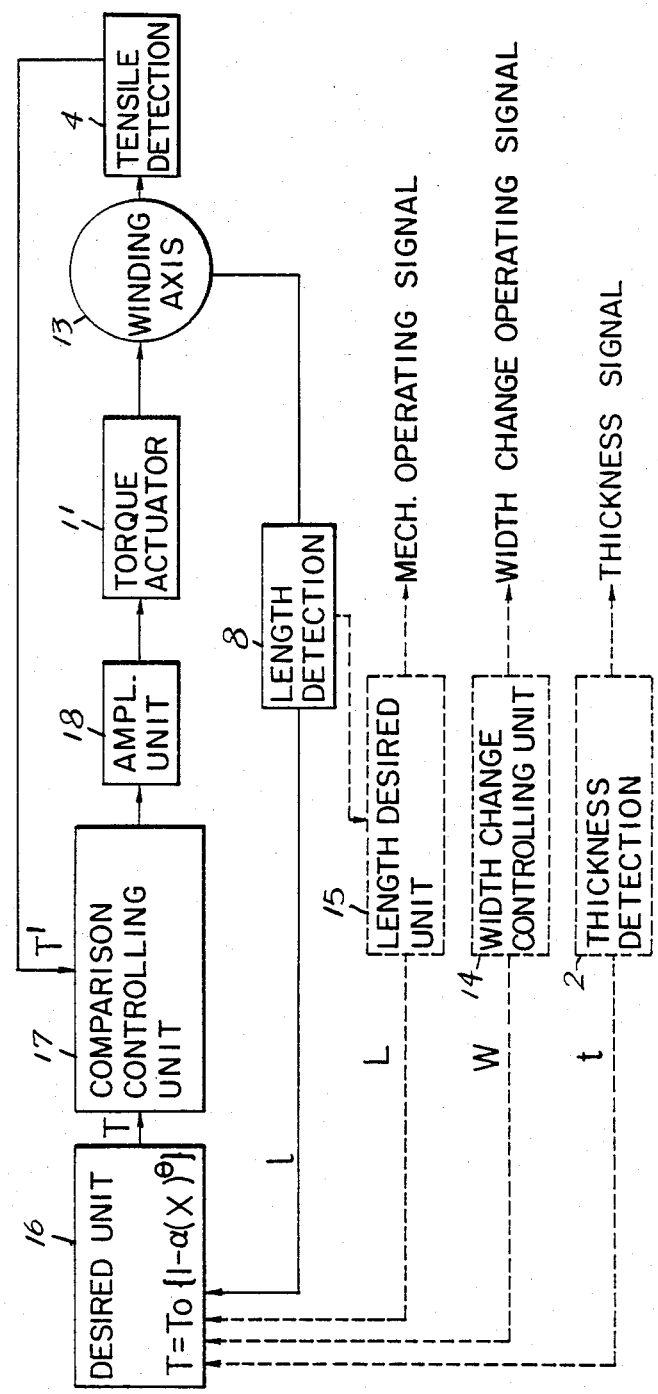
F I G. 3

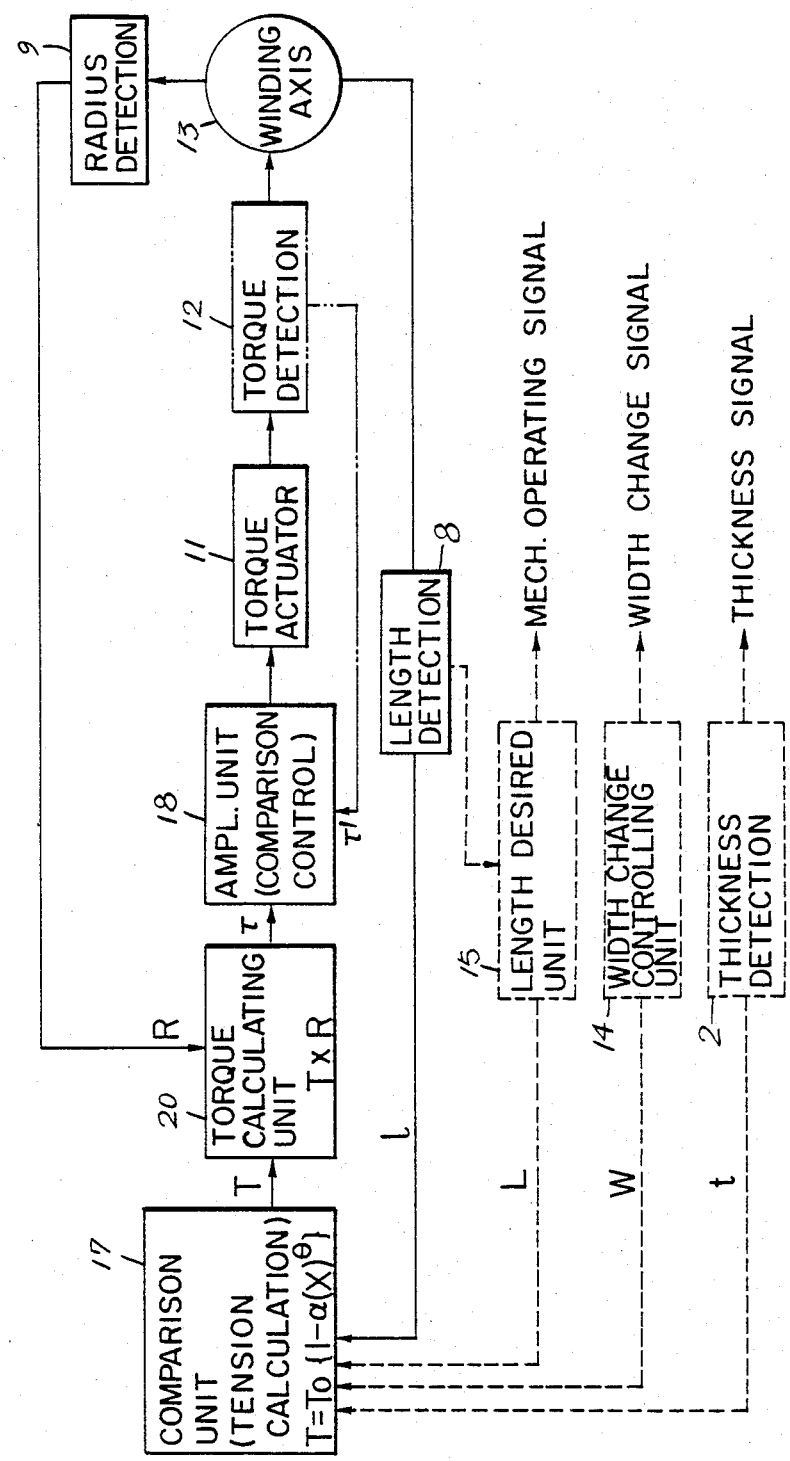
F I G. 5

APPARATUS FOR CONTROLLING WINDING TENSION

This is a continuation of application Ser. No. 416,917, filed Sept. 13, 1982 (abandoned), which in turn is a continuation of application Ser. No. 174,579, filed Aug. 4, 1980 (abandoned), which in turn is a divisional of application Ser. No. 41,410 filed May 22, 1979 (U.S. Pat. No. 4,238,084), which in turn is a continuation of application Ser. No. 660,632 filed Feb. 23, 1976 (abandoned), which in turn is a continuation-in-part of application Ser. No. 485,618 filed July 3, 1974, now abandoned.

This invention relates to an apparatus of controlling the winding tension of a sheet band, and more particularly to a control method adopted to wind the sheet under an ideal tensile taper.

In case of winding a sheet, such as paper, plastic film and cloth, by the center drive system, the most important factor for determining the quality of the sheet is obviously the winding tension. It is general empirical knowledge that winding under a certain ideal state of attenuating tension is preferred. The state is called the taper tension, and depends on the material of the sheet to be wound, the size, the running condition, etc.

As disclosed in U.S. Pat. No. 3,871,598 the patentee has employed the winding radius as the growing condition of the winding, and has achieved desired tension characteristics for the growth of the winding. By incorporating such a system concretely into a winder, the patentee has performed especially a free control of the winding tension, and has attained remarkable results in a variety of actual operations.

In search of the governing principle of the winding job, the applicant has noted a fact to be stated below. Where the sheet is wound and finished into a rolled product, the quantity of the roll is determined by the winding length of the sheet in nearly all products. In consequence, the winding radius is secondarily determined.

That is, when the winding length set as a desired value is reached, the winder is automatically stopped, or it automatically changes-over a bobbin to a new one.

In view of this fact, the invention has been made to detect the growing condition of the winding and to automatically control the tensile characteristic relative to the condition based on the winding length.

An object of this invention is to provide a method by which the tension is gradually decreased following a predetermined relational equation with the winding length, and both inner and outer winding layers are finished at a uniform winding density.

Another object of this invention is to provide a system which can automatically control the winding tension while detecting the winding length.

Other features and advantages of the invention will be apparent from the following description taken in connection with the accompanying drawing wherein:

FIG. 1 is a characteristic curve diagram of the winding tension-versus-the dimension of winding in the apparatus of this invention;

FIG. 3 is a fundamental control flow diagram of this invention; and

FIGS. 4 and 5 are control flow diagrams according to modifications of this invention.

FIG. 1 shows the control curves of the winding tension of this invention. It illustrates the state in which the winding is started from a radius at winding initiation, $R_{min}$ and the tension is gradually reduced down to a radius at winding termination, $R_{max}$.

Figure 2:
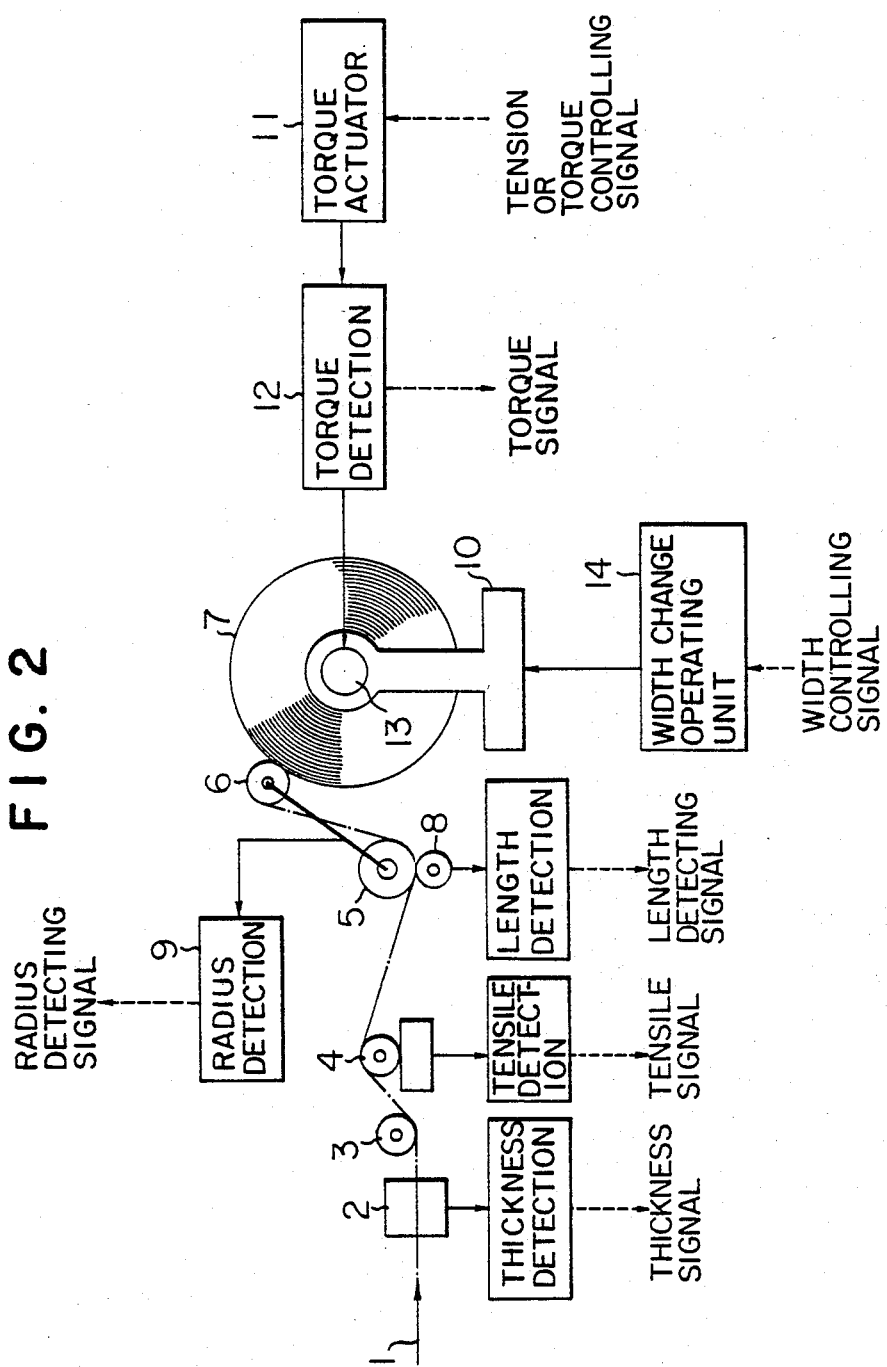
FIG. 2 is a schematic arrangement plan of a system for performing this invention.

The basis of this invention is fully expressed by the characteristics in FIG. 1. The characteristics are represented by the following theoretical equation in any case:

$$T = T_o \{1 - \alpha(X)^\theta\}$$

where

T is a winding tension under an arbitrary winding growing condition, $T_o$ is a tension setpoint at starting (called the tension level), $\alpha$ is a coefficient indicating the rate of variation of the tension, X is the proportion of the dimension of a roll in the course of winding with respect to the dimension setpoint of the winding roll, and $\theta$ is an exponent indicating the variation characteristic of the tension.

In the above equation the coefficients and exponent have the following meanings. The coefficient $\alpha$ represents the rate of change of the tension. With $\alpha = 0$, $T = T_O$, so that a constant tension characteristic is obtained. When $\alpha = \pm 1$, $T = T_O(1 \pm X^\theta)$, so that a tension characteristic increasing or decreasing by 100% with respect to the tension at the time of the start is obtained. When $\alpha = \pm 0.5$, $T = T_O(1 \pm \frac{1}{2}X^\theta)$, so that a tension characteristic increasing or reducing by 50% with respect to the tension at the time of the start is obtained. The exponent $\theta$ has the following content. When $\theta = 1$, $T = T_O(1 - X)$, so that a linear characteristic as shown in FIG. 1 is obtained. For $\theta > 1$ an upwardly convexed curve is obtained, for $\theta < 1$ an upwardly concave curve is obtained, and with $\theta = -1$ a hyperbolic curve is obtained. With the combinations of these coefficient and exponent, $\alpha$ and $\theta$ respectively, a desired tension characteristic can be obtained. Particularly, in case of a linear characteristic with $\theta = 1$, the rate of change of tension is referred to as "degree of taper".

The fundamental construction of this invention is broadly classified into the step of setting the desired tension from the dimension of the winding roll, and the step of detecting and calculating the winding tension.

For the step of setting the desired tension from the dimension of the winding roll, the theoretical equation is applied and developed. The term (X) in the equation $T = T_o \{1 - \alpha(X)^\theta\}$ concretely has the following four cases as the dimension based on the winding length:

Case I where only the winding length is a condition. In this case, $$X = (l/L)$$

where

L is a desired winding length, and l is any winding length in the course of winding.

Case II where the winding surface area is a condition. In this case, $$X = (a/A) = (W \cdot l)/(W \cdot L)$$

where

A is a winding surface area at the setpoint which setpoint is the desired value as to surface area of the desired finished rewound roll, a is any winding surface area in the course of winding, and W is the width of a sheet.

Case III where the winding volume is a condition.

In this case, $$X = (v/V) = (W \cdot t \cdot l)/(W \cdot t \cdot L)$$

where

V is a winding volume at the setpoint which setpoint is the desired value as to winding volume of the desired finished rewound roll, v is any winding volume in the course of winding, and t is the thickness of a sheet.

Case IV where the winding sectional area is a condition.

In this case, $$X = (a_c/A_c) = (t \cdot l)/(t \cdot L)$$

where $A_c$ is a winding sectional area at the setpoint which setpoint is the desired value as to sectional area of the desired finished rewound roll, and $a_c$ is any winding sectional area in the course of winding.

FIG. 2 shows a layout for explaining the control system of this invention.

A sheet 1 has its thickness measured by a thickness detector 2 as may be needed. It seems that a system employing β-rays is often utilized for the thickness detector 2. Sheet 1 passes over a tension detector 4 via a guide roll 3. Further, it passes via a guide roll 5 as well as a touch roll 6, and reaches a winding roll 7.

Generally utilized for the tensile detection system is means to convert the amount of displacement of the roll, generated by the resultant tension, into an electric signal by the use of a differential transformer, a strain gauge or the like.

A length detector 8 situated midway is usually a pulse generator which generates a pulse per unit length as the sheet proceeds.

In case of the winding system employing the touch roll as shown by way of example in FIG. 2, a radius detector 9 can readily obtain the winding radius by detecting the displacement angle of the touch roll 6. As a method in the case where the touch roll is not employed, there may be taken a measure in which two factors of the number of revolutions (n) of the winding roll and the line speed (S) are detected and a calculation of $R = S/(2\pi n)$ is performed.

A core 13 of the winding roll 7 is laid on a winder 10. A driving torque is transmitted from a device, called a torque actuator, 11 through a torque detector 12 to the core 13. Although a precise structure is omitted, the torque actuator 11 can vary the driving torque by a mechanical drive method and through an automatic control system forming the basis of this invention.

The driving system for the torque actuator 11 combines a motor and a clutch, and controls the transmission torque of the clutch. Alternatively, it directly controls a D.C. motor or a torque motor. The torque detector 12 which is assembled if necessary, includes one in which the twist of a torsion bar is obtained in the electrical form of a phase difference signal or a strain gauge signal.

A width change operating unit 14 is a device which serves, for example, to alter the position of the winder 10 or to move slitters, not shown, in case where the sheet width for winding is to be changed.

Description will now be made of embodiments of the control system in which are combined the step of one part of the fundamental construction of this invention for setting a desired tension from the dimension of the winding roll, the step having thus far been explained, and the step of the other part for detecting and calculating the winding tension.

FIG. 3 shows a contrivance which detects the sheet tension in the course of the transfer of a sheet band and which compares and controls the detected value and a desired tensile value. The control flow will be understood from the figure very clearly. The aspect of making the winding condition "on-line" in the tensile control system is as stated below. Broken lines in the figure indicate the associated parts. The system includes a desired tension unit 16, comparison controlling unit 17, amplifier unit 18, winding axis 13 and tensile detection 4.

A desired length unit 15 generates, when the length aimed at is reached, a signal which automatically stops the machine or which changes-over a bobbin to a new one. In the tensile control system, the amount of the signal signifies the quantity (L). By interlocking the signal with the tensile control system, which means to electrically interlock or connect a signal of the desired length used to control the tension and a signal to sequentially control the machine there is achieved the great merit that the tensile characteristic of a roll product normalized by the length is automatically determined.

Where the surface area or the volume is a winding growing condition, a coefficient, a signal giving a magnitude of the winding width, corresponding to the change of the sheet width needs to be given to a desired tension unit 16. When a mechanism for the mechanical automatic control of the winder for the width change is included, the same great merit in the working property as in the above is achieved by interlocking the signal of the mechanism and the signal for the desired tension unit 16 which means to electrically interlock a signal of winding width used to control the tension and a sequence control signal of the width change operating system.

Where the thickness detection is carried out under the progress of the sheet or where the sectional area or the volume is a winding growing condition, the corresponding quantity is similarly interlocked as a coefficient setting signal for the desired tension unit which means to electrically interlock a sheet thickness signal used to control the tension and a signal of a sheet thickness gauge.

Figure 4:
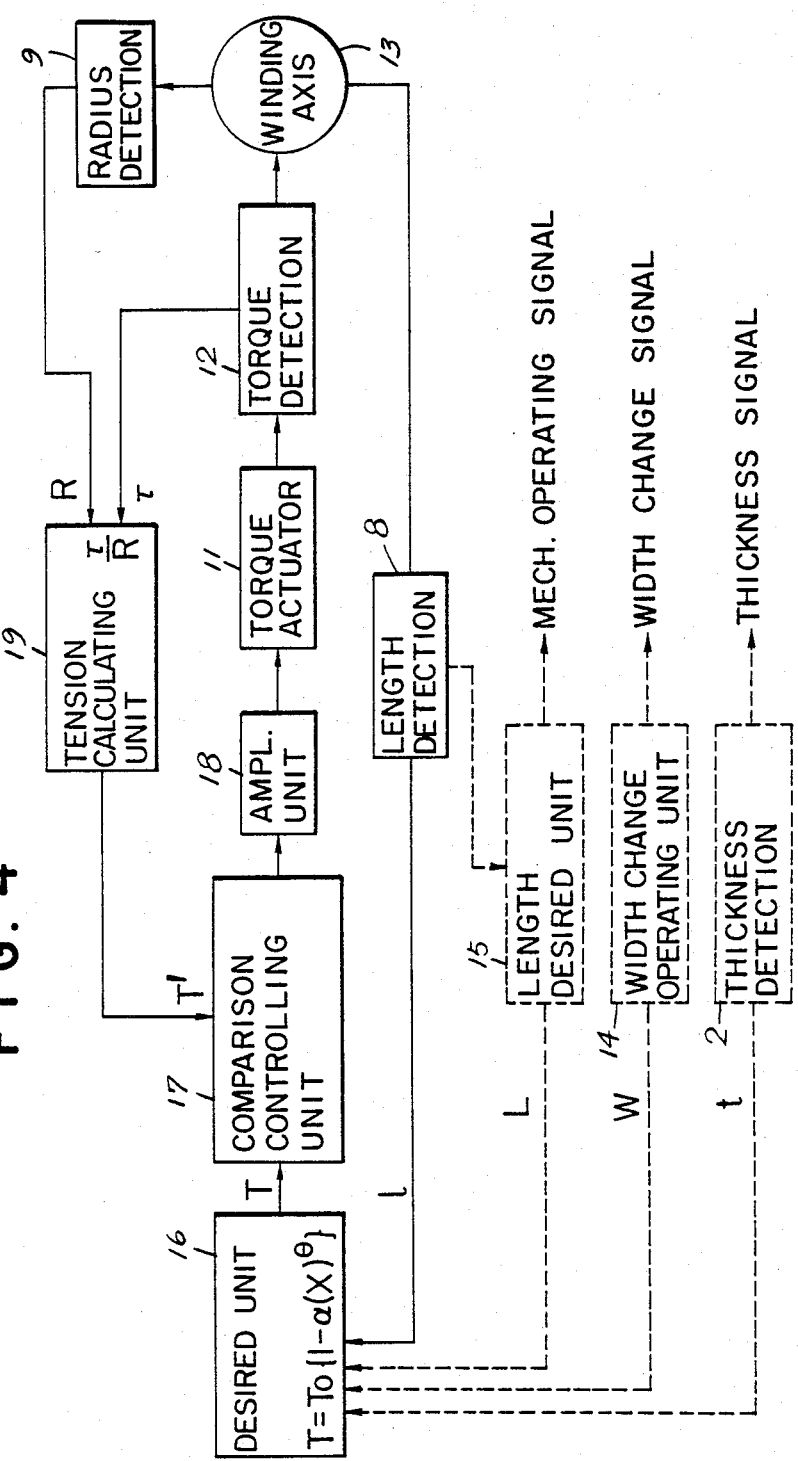

FIG. 4 shows a second embodiment of this invention. This system having a tension calculating unit 19 between a torque detection 12 and a comparison controlling unit 17. The magnitude ($\tau$) of the torque of the center drive as supplied for the winding drive and the radius (or diameter) (R) for the amount of increase in the growth of the winding are respectively measured, and a calculation ($T = \tau/R$) for evaluating the tension is executed. It intends to control the winding tension while comparing and controlling the calculated value and the desired tensile value.

The performance of the on-line control indicated by broken lines is the same as explained with reference to FIG. 3.

FIG. 5 shows a third embodiment of this invention. This system has a torque calculating unit 20 between a comparison unit 17 and an amplifier unit 18. The tensile value fulfilling the desired tensile characteristic by employing only the winding length signal obtained from the length detecting unit, derives a torque setting signal by the product between the calculated tensile value and the winding radius separately measured, and controls the torque actuator on the basis of the torque setting signal. If necessary, the feed-back of the detected torque value can be combined so as to enhance the precision (refer to parts of two-dot chain lines).

The performance of the on-line control indicated by broken lines is the same as explained with reference to FIG. 3.

A polypropylene film having a uniform thickness of $20 \sim 30 \mu$ and a width of 300 mm was taken up into a roll under the final winding length L=2000 m. In the case, the rate of variation of the tension $\alpha = 50 \sim 70\%$, the set value of the variation characteristic of the tension was $\theta = \frac{5}{8} \sim 6/8$, and the initial tension was $T_O = 5 \sim 7$ kg. Control by the theoretical equation was made with the growth of winding, and the film was wound under a tension characteristic which gradually decreased in a convex curve. The wound roll had a uniform winding density. When the final winding length was L=4000 m, the film could be satisfactorily wound under the same conditions except $\alpha = 40 \sim 50\%$.

The feature of the invention resides in a control based on a theoretical equation, where the factor of the tension characteristic is freely selected. The factor of the tension characteristic is not fixed but is set to an optimum value in dependence upon the physical characteristics of the sheet material being processed and processing conditions. In other words, it is determined from the combination of coefficient of friction, hardness, percentage of elongation, flatness, processing width, thickness and winding quantity of the sheet material and other conditions.

This invention is applicable to cases of winding and working all sorts of sheet bands including any paper sheet, plastic film, etc. For example, it can be applied to a winding machine which is directly coupled to a sheet making machine, or a winding machine which is connected with a laminater, coater or printing machine. It can also be applied to a slitter rewinder. The analog control technique and the digital control technique are typical recommendations in specific means for constructing the control device.

What is claimed is:

1. A sheet winding control device for a winder of a center drive type having a structure for adjusting the sheet winding torque of a core of a winding roll, said device comprising:
    means for detecting the winding length of the sheet;
    means for evaluating the desired winding tension of the sheet from the detected winding length of the sheet and for producing a tension signal by generating a signal proportional to the intial winding tension, generating a signal proportional to the actual winding length, dividing said last mentioned signal by a signal proportional to the total winding length to obtain a signal representing a variable (x), multiplying the signal representing the variable (x) by the signal representing the initial winding tension and by a constant predetermined signal representing the rate of change of the tension, and subtracting the resulting signal from the signal representing the initial tension;
    means for detecting a winding radius of the sheet on the winding roll and producing a winding radius signal;
    torque calculating means for multiplying the tension signal by the winding radius signal to convert thereby the tension signal into a torque control signal; and
    means for driving a torque actuator according to the torque control signal from said torque calculating means.

* * * * *